United States Patent
Dinu et al.

(10) Patent No.: US 8,490,406 B2
(45) Date of Patent: Jul. 23, 2013

(54) METHOD AND APPARATUS FOR CONTROLLING A HEATING VALUE OF A LOW ENERGY FUEL

(75) Inventors: Constantin Dinu, Greer, SC (US); Gilbert Kraemer, Greer, SC (US); Geoffrey D Myers, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 868 days.

(21) Appl. No.: 12/350,061

(22) Filed: Jan. 7, 2009

(65) Prior Publication Data

US 2010/0170266 A1 Jul. 8, 2010

(51) Int. Cl.
*F02C 7/22* (2006.01)

(52) U.S. Cl.
USPC ...... 60/778; 60/39.12; 60/39.281; 60/39.463; 60/39.465; 60/772; 60/776

(58) Field of Classification Search
USPC ............. 60/39.12, 39.281, 39.461, 39.463, 60/39.465, 772, 776
See application file for complete search history.

(56) References Cited

U.S. PATENT DOCUMENTS

| | | | | |
|---|---|---|---|---|
| 4,148,599 A * | 4/1979 | Reed et al. | | 431/11 |
| 4,202,168 A * | 5/1980 | Acheson et al. | | 60/777 |
| 4,761,948 A * | 8/1988 | Sood et al. | | 60/39.281 |
| 4,833,878 A * | 5/1989 | Sood et al. | | 60/39.463 |
| 5,165,224 A | 11/1992 | Spadaccini et al. | | |
| 6,174,160 B1 * | 1/2001 | Lee et al. | | 431/11 |
| 6,199,366 B1 * | 3/2001 | Murata et al. | | 60/785 |
| 6,201,029 B1 * | 3/2001 | Waycuilis | | 60/651 |
| 6,226,976 B1 * | 5/2001 | Scott et al. | | 60/773 |
| 6,247,299 B1 * | 6/2001 | Buss et al. | | 60/776 |
| 6,609,378 B2 * | 8/2003 | Scott | | 60/773 |
| 6,779,333 B2 * | 8/2004 | Gerhold | | 60/39.53 |
| 6,896,707 B2 * | 5/2005 | O'Rear et al. | | 44/300 |
| 7,089,745 B2 | 8/2006 | Roby et al. | | |
| 2005/0126178 A1 * | 6/2005 | Rebhan et al. | | 60/39.463 |
| 2006/0234171 A1 * | 10/2006 | Tanabe et al. | | 431/2 |
| 2007/0113560 A1 * | 5/2007 | Steber et al. | | 60/39.281 |
| 2010/0162678 A1 * | 7/2010 | Annigeri et al. | | 60/39.281 |

OTHER PUBLICATIONS

Gusso, Raffaello et al.; Cogeneration Combined-Cycles for the Steel Industry Utilizing Compressed BFG/COG/LDG/Gas; Research and Development; pp. 24-28; 1995.

* cited by examiner

*Primary Examiner* — Ehud Gartenberg
*Assistant Examiner* — Lorne Meade
(74) *Attorney, Agent, or Firm* — Fletcher Yoder, P.C.

(57) ABSTRACT

A method and apparatus to determine a first heating value of a low BTU fuel, determine a target fuel quality level based on a state of a turbine system, control a second heating value of a high BTU fuel, and inject the high BTU fuel into the low BTU fuel to achieve the target fuel quality level.

27 Claims, 5 Drawing Sheets

METHOD AND APPARATUS FOR CONTROLLING A HEATING VALUE OF A LOW ENERGY FUEL

BACKGROUND OF THE INVENTION

The present disclosure relates generally to a system and arrangement for controlling a heating value of a fuel, such as a low energy fuel, in various applications such as gas turbines.

Certain fuels have a low energy value, such as a low British thermal unit (low BTU or LBTU), which make these fuels undesirable for use in certain engines, e.g., a gas turbine engine. For example, the LBTU fuel may produce a low amount of heat per volume of fuel. As a result, the LBTU fuel may cause undesirable combustions conditions, such as auto ignition or early flame holding. These conditions can lead to reduced control and power within the engine, e.g., a gas turbine engine.

Gas turbine engines typically burn a high BTU (HBTU) fuel, which may produce a relatively higher amount of heat per volume of fuel. As a result, the high BTU fuel generally ensures proper operation, performance, and efficiency of the gas turbine engine. Unfortunately, these high BTU fuels may be unavailable, expensive, or undesirable for other reasons. In certain facilities, LBTU fuels may be available, but may not be utilized due to their undesirable characteristics. For example, the LBTU fuels may be a byproduct of a refinery or other facility.

BRIEF DESCRIPTION OF THE INVENTION

In an embodiment, a method includes determining a first heating value of a low BTU fuel, determining a target fuel quality level based on a state of a turbine system, controlling a second heating value of a high BTU fuel, and injecting the high BTU fuel into the low BTU fuel to achieve the target fuel quality level. In one embodiment, a turbine system includes a controller configured to control mixing of a low BTU fuel with a high BTU fuel to produce a mixed fuel. Further, the controller determines a target first heating value for the mixed fuel based on a state of the turbine system and the controller is configured to control a ratio of the low BTU fuel to the high BTU fuel to achieve the first heating value for the mixed fuel. In another embodiment, a turbine system includes a controller configured to control mixing of a low BTU fuel with a high BTU fuel to produce a mixed fuel, wherein the controller determines a target first heating value for the mixed fuel based on a state of the turbine system. Further, the controller is configured to control a ratio of the low BTU fuel to the high BTU fuel to achieve the first heating value for the mixed fuel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

In certain embodiments, the systems and methods described herein include controlling a heat value or energy value of fuel by mixing fuels with different levels of energy and/or heat output per volume. For example, the disclosed embodiments may mix different fuels with high and low energies (BTU levels), high and low values of heat output, or a combination thereof. Thus, the disclosed embodiments may enable use of less desirable fuels or byproducts (e.g., LBTU fuels) by adding some amount of a more desirable fuel (e.g., HBTU fuel) to create a mixture with an improved heat value or energy value. As a result, the disclosed embodiments may improve overall efficiency of a facility or refinery by using otherwise wasted byproducts for fuel in gas turbine engines and power generation equipment. Examples of LBTU fuels are Coke Oven Gas (COG) or Blast Furnace Gas (BFG). HBTU fuels which could be used are biofuels, heavy fuel oils, kerosene and diesel fuels. These are examples and are not intended to limit the range of LBTU or HBTU fuels which would fall under the scope of the present invention.

A heating value may be used to define energy characteristics of a fuel. For example, the heating value of a fuel may be defined as the amount of heat released by combusting a specified quantity of fuel. In particular, a lower heating value (LHV) may be defined as the amount of heat released by combusting a specified quantity (e.g., initially at 25° C. or another reference state) and returning the temperature of the combustion products to a target temperature (e.g., 150° C.). One example of LHV is British thermal unit (BTU) per standard cubic foot (scf), e.g., BTU/scf. A standard cubic foot (scf) may be defined as a measure of quantity of gas, equal to a cubic foot of volume at 60 degrees Fahrenheit and either 14.696 pounds per square inch (1 atm) or 14.73 PSI (30 in Hg) of pressure. By further example, a higher heating value (HHV) may be defined as the heat of condensation of water in the combustion products. In the following discussion, LHV and/or BTU levels (e.g., low or high) may be used to indicate the heating value of various fuels, but it is not intended to be limiting in any way. Any other value may be used to characterize the energy and/or heat output of fuels within the scope of the disclosed embodiments.

In certain embodiments, the disclosed embodiments may include a controller, control logic, and/or a system having combustions controls configured to facilitate a desired mixture of LBTU and HBTU fuels to attain a suitable heating value (e.g., LHV) for the application. For example, one embodiment may use a LBTU gas fuel as a primary fuel source, and add a small quantity of HBTU liquid fuel to create a mixture with a relatively higher heating value (e.g., higher LHV) than the original LBTU fuel. Thus, the disclosed embodiments may also include a fuel mixing system coupled to various controls. In addition, the disclosed embodiments may be described as performing a mixing of HBTU and LBTU fuels fuel streams in real time or on the fly, as the fuel is delivered to the combustion area, in response to system conditions. This is an improvement in efficiency over using a premixed fuel or a HBTU fuel by itself.

The high BTU (HBTU) liquid fuel may be injected and mixed with the LBTU gas fuel stream in varying amounts, depending upon system conditions. For instance, during periods of low power demand, such as during a steady state turbine operation, a small flow of the HBTU liquid fuel may be mixed with the LBTU gas fuel stream. Then, during periods of high power demand, such as at start up or high loads, a larger flow of the HBTU liquid fuel may be mixed with the LBTU gas fuel system. Moreover, mixing process may be adjusted according to several factors, including the state of the turbine system, such as a start-up condition, a heavy load condition, a transient condition, a steady state condition, a low load condition, or a combination thereof. Further, other examples of system conditions that may affect a mixture process may include altitude, pressure, or temperature. By more efficiently utilizing the HBTU fuel and LBTU fuel stream mixtures produced by the mixing process, the fuel control system may become more flexible, more efficient, and more controllable. Moreover, the mixing system used in the fuel control process may be used in several types of turbine systems in various conditions, leading to overall cost reductions.

Figure 1:
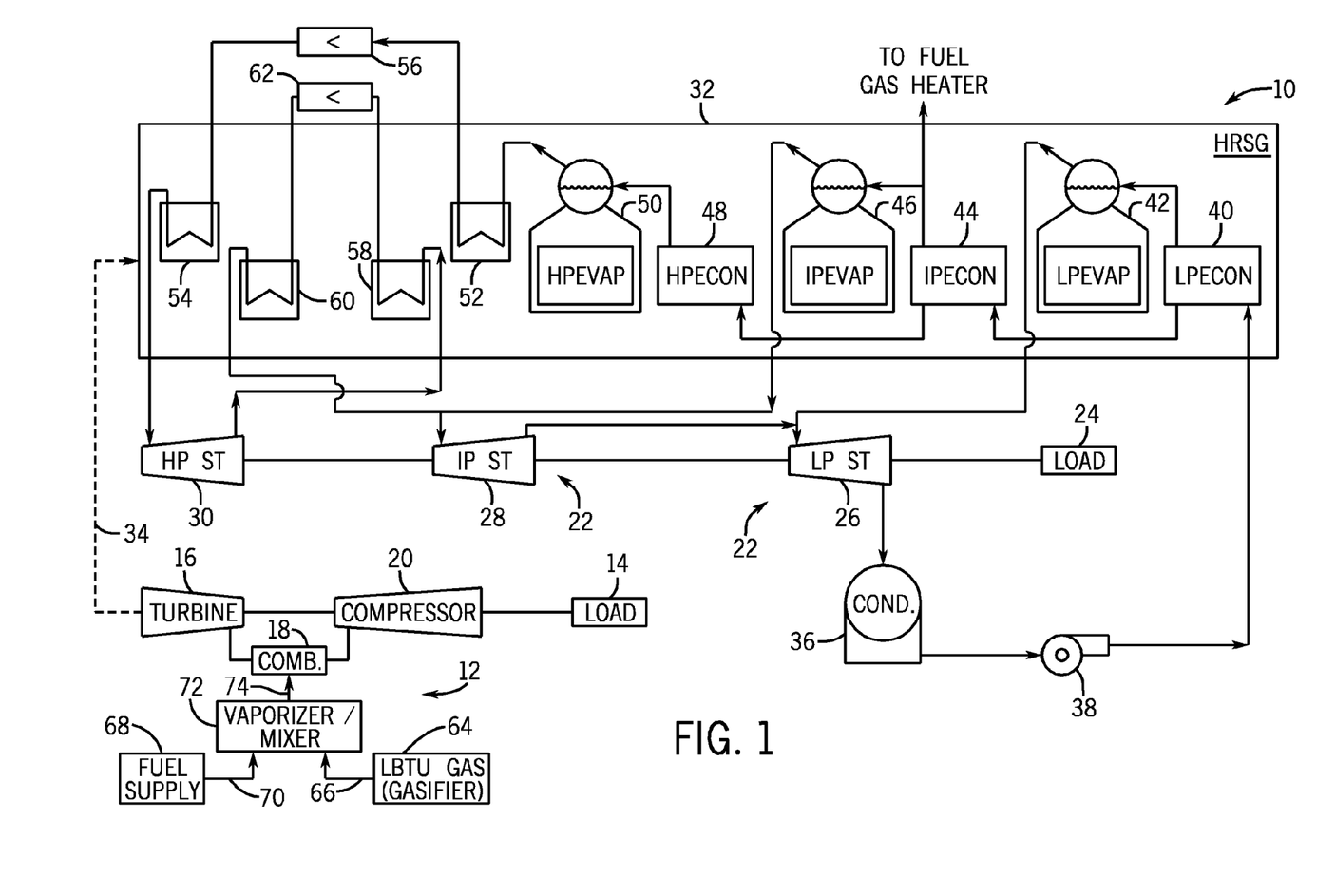
FIG. 1 is a schematic block diagram of an embodiment of a power generation system having a gas turbine, a steam turbine, a heat recovery steam generation system, and a fuel mixing system.

FIG. 1 is a schematic flow diagram of an embodiment of a combined cycle power generation system 10 having a gas turbine, a steam turbine, and a heat recovery steam generation (HRSG) system. The system 10 may include a gas turbine 12 for driving a first load 14. The first load 14 may, for instance, be an electrical generator for producing electrical power. The gas turbine 12 may include a turbine 16, a combustor or combustion chamber 18, and a compressor 20. The system 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In addition, although the gas turbine 12 and steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The system 10 may also include a multi-stage HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

The condensate may then flow through a low-pressure economizer 40 (LPECON), e.g., a device configured to heat feedwater with gases, which may be used to heat the condensate. From the low-pressure economizer 40, the condensate may either be directed into a low-pressure evaporator 42 (LPEVAP) or toward an intermediate-pressure economizer 44 (IPECON). Steam from the low-pressure evaporator 42 may be returned to the low-pressure section 26 of the steam turbine 22. Likewise, from the intermediate-pressure economizer 44, the condensate may either be directed into an intermediate-pressure evaporator 46 (IPEVAP) or toward a high-pressure economizer 48 (HPECON). In addition, steam from the intermediate-pressure economizer 44 may be sent to a fuel gas heater (not shown) where the steam may be used to heat fuel gas for use in the combustion chamber 18 of the gas turbine 12. Steam from the intermediate-pressure evaporator 46 may be sent to the intermediate-pressure section 28 of the steam turbine 22. Again, the connections between the economizers, evaporators, and the steam turbine 22 may vary across implementations as the illustrated embodiment is merely illustrative of the general operation of an HRSG system that may employ unique aspects of the present embodiments.

Finally, condensate from the high-pressure economizer 48 may be directed into a high-pressure evaporator 50 (HPEVAP). Steam exiting the high-pressure evaporator 50 may be directed into a primary high-pressure superheater 52 and a finishing high-pressure superheater 54, where the steam is superheated and eventually sent to the high-pressure section 30 of the steam turbine 22. Exhaust from the high-pressure section 30 of the steam turbine 22 may, in turn, be directed into the intermediate-pressure section 28 of the steam turbine 22, and exhaust from the intermediate-pressure section 28 of the steam turbine 22 may be directed into the low-pressure section 26 of the steam turbine 22.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure section 30 of the steam turbine 22 may be directed into a primary re-heater 58 and a secondary re-heater 60 where it may be re-heated before being directed into the intermediate-pressure section 28 of the steam turbine 22. The primary re-heater 58 and secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as system 10, hot exhaust may flow from the gas turbine 12 and pass through the HRSG 32 and may be used to generate high-pressure, high-temperature steam. The steam produced by the HRSG 32 may then be passed through the steam turbine 22 for power generation. In addition, the produced steam may also be supplied to any other processes where superheated steam may be used. The gas turbine 12 generation cycle is often referred to as the "topping cycle," whereas the steam turbine 22 generation cycle is often referred to as the "bottoming cycle." By combining these two cycles as illustrated in FIG. 1, the combined cycle power generation system 10 may lead to greater efficiencies in both cycles. In particular, exhaust heat from the topping cycle may be captured and used to generate steam for use in the bottoming cycle.

The combined cycle power generation system 10 illustrated in FIG. 1 may be converted into an IGCC power generation system 10 by introducing a gasifier/gas fuel source 64 into the system 10. In a coal gasification process, performed within the gasifier/gas fuel source 64, rather than burning the coal, the gasifier/gas fuel source 64 may break down the coal chemically due to the interaction with steam and the high pressure and temperature within the gasifier/gas fuel source 64. From this process, the gasifier/gas fuel source 64 may produce a fuel or gas mixture 66 of primarily CO and $H_2$. Further, fuel supply 68 may provide a liquid fuel 70 with a high heating value to be mixed with fuel or gas mixture 66. The liquid fuel 70 may be a HBTU fuel, such as biofuels, heavy fuel oils, kerosene, and diesel fuels. These examples are not intended to limit the HBTU fuels which would fall under the scope of the present embodiment. The gas mixture 66 may be referred to as synthesis gas (e.g., syngas) and may be burned in combustor 18 after mixing with liquid fuel 70 inside vaporizer/mixer 72. The mixed fuel 74 may be injected into combustor 18 via one or more fuel nozzles that enable a combustion process to drive turbine 16. As described in detail below, fuel or gas mixture 66 may be a LBTU fuel source that has a low heating value (e.g., low LHV value), which can be difficult to burn efficiently. Fuel supply stream 70 may be a liquid HBTU fuel with a high heating value (e.g., high LHV value), thereby enabling more efficient burning of the mixed fuel 74 within combustor 18. As appreciated, the disclosed embodiments could be used is simple cycle applications as well. In such cases the disclosed techniques and systems would apply without the use of a steam turbine.

Although the heating values of the fuels 66, 70, and 74 may vary depending on the application, operating conditions, and other factors, several examples are provided below merely to illustrate the disclosed embodiments. In certain embodiments, the LBTU gas fuel 66 may have a LHV of less than about 200 BTU/scf, while the HBTU liquid fuel 70 may have a LHV of greater than about 200 BTU/scf. In this embodiment, the mixture of fuels 66 and 70 may produce the fuel 74 with a LHV of at least greater than about 200 BTU/scf or at least between 200-300 BTU/scf or greater. However, this is merely one possible example of the fuels 66, 70, and 74.

In certain embodiments, the LBTU gas fuel 66 may have a LHV of about (or less than) 50, 75, 100, 125, 150, 175, 200, 225, or 250 BTU/scf. In this embodiment, the liquid fuel 70 may have a LHV of at least greater than the LBTU gas fuel 66. For example, the LHV of the fuel 70 may be about (or greater than) 200, 250, 300, 350, 400, 450, or 500 BTU/scf, or greater. In this embodiment, the fuel mixture 74 may have a LHV of at least greater than the LBTU gas fuel 66. For example, the LHV of the fuel mixture 74 may be about (or greater than) 200, 250, 300, 350, 400, 450, or 500 BTU/scf, or greater.

As discussed below, gas turbine or turbine system 12 may include a control system coupled to mixer 72 which adjusts the ratio, flow rates, temperature, and other conditions of liquid fuel 70, gas mixture 66, and mixed fuel 74. Specifically, the flow rate and overall amount of liquid fuel 70 routed to mixer 72 may be increased during heavy turbine load conditions. Heavy turbine load conditions may occur during system start up or during periods of peak demand. During system start up, the gas turbine 12 may demand a high power output to begin the turbine cycle and move components, such as turbine blades, that are typically stationary before start up. In addition, for a turbine that is used to produce power, at peak power usage times the turbine load may be higher. In start up and other heavy load turbine system conditions, the control system may increase the flow rate of liquid fuel 70, thereby increasing the ratio of HBTU fuel to LBTU fuel in the mixer 72 and also increasing the overall quality of the mixed fuel 74 supplied to combustor 18. Further, the mixed fuel 74 has a higher heating value (e.g., higher LHV value), enabling greater control over when and where the fuel is burned in the combustor. In such an embodiment, the turbine 12, mixer 72, and the controller provide greater control over the combustion process.

Figure 2:
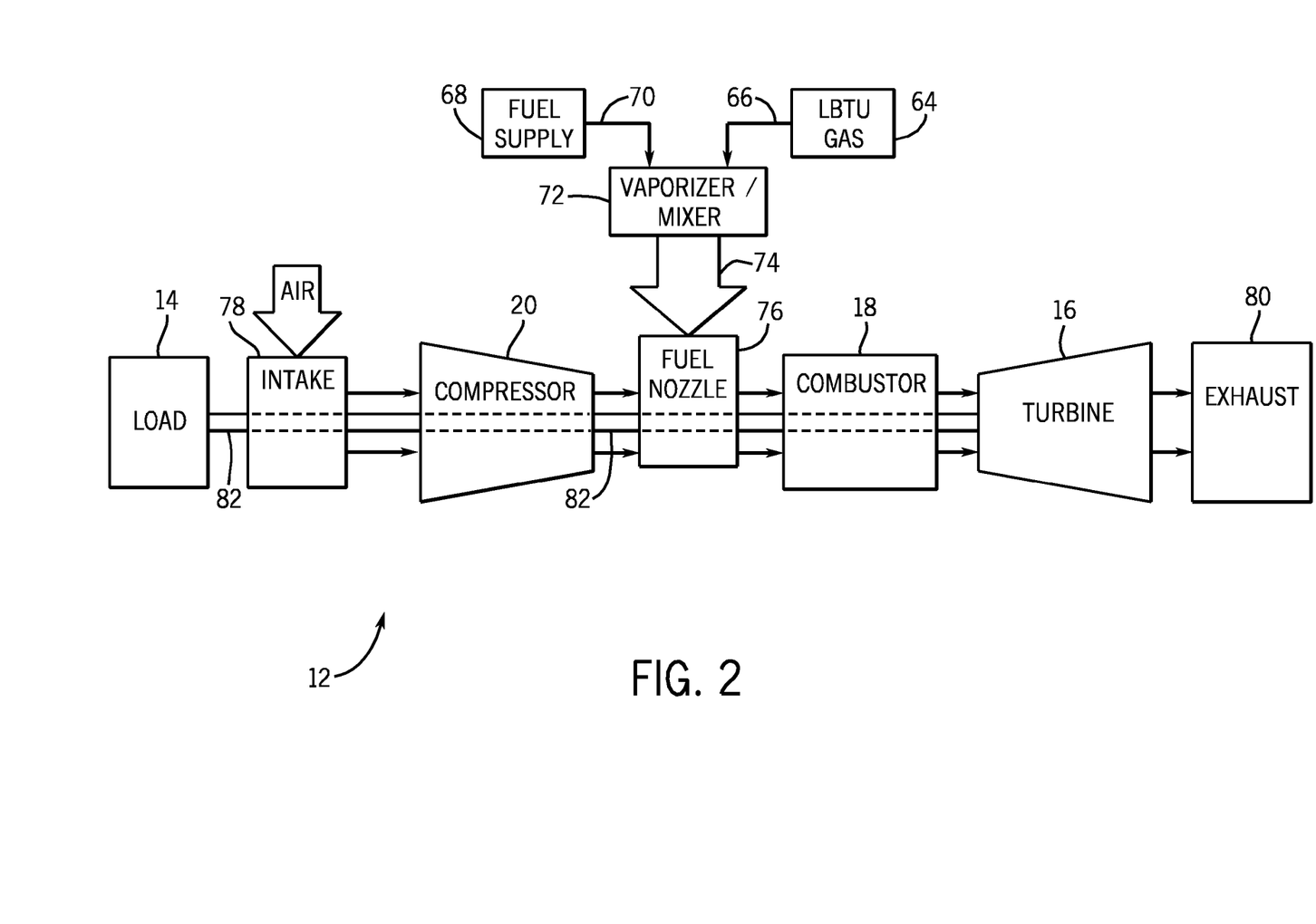
FIG. 2 is a block diagram of an embodiment of a turbine system having a mixer, fuel supply, LBTU gas supply, and combustor.

In FIG. 2, a block diagram of an embodiment of turbine system 12 is illustrated. Turbine system 12 may use liquid or gas fuel, such as natural gas and/or a hydrogen rich syngas, to run the turbine system 10. In the illustrated embodiment, the vaporizer/mixer 72 is configured to receive multiple fuels of different energy or heating values (e.g., LBTU gas fuel 66 and HBTU liquid fuel 70) and deliver the mixture 74 to the fuel nozzle 76. For example, the vaporizer/mixer 72 may atomize and/or vaporize the HBTU liquid fuel 70 and mix it with the LBTU gas fuel 66 to create the fuel mixture 74 with a relatively higher LHV than the original LBTU gas fuel 66. In an embodiment, the HBTU liquid fuel 70 may be vaporized during mixing by a process, such as atomization, heat addition, or a combination thereof. As depicted, fuel nozzles 76 intake the fuel mixture 74, mix the fuel with air from intake 78, and distribute the air-fuel mixture into a combustor 18. The air-fuel mixture combusts in a chamber within combustor 18, thereby creating hot pressurized exhaust gases. The combustor 18 directs the exhaust gases through a turbine 16 toward an exhaust outlet 80. As the exhaust gases pass through the turbine 16, the gases force turbine blades to rotate a shaft 82 along an axis of system 12. As illustrated, shaft 82 is connected to various components of turbine system 12, including compressor 20. Compressor 20 also includes blades coupled to shaft 82. Thus, blades within compressor 20 rotate as shaft 82 rotates, thereby compressing air from air intake 78 through compressor 20 into fuel nozzles 76 and/or combustor 18. Shaft 82 is also connected to load 14, which may be a vehicle or a stationary load, such as an electrical generator in a power plant or a propeller on an aircraft. Load 14 may be any suitable device that is powered by the rotational output of turbine system 12.

Figure 3:
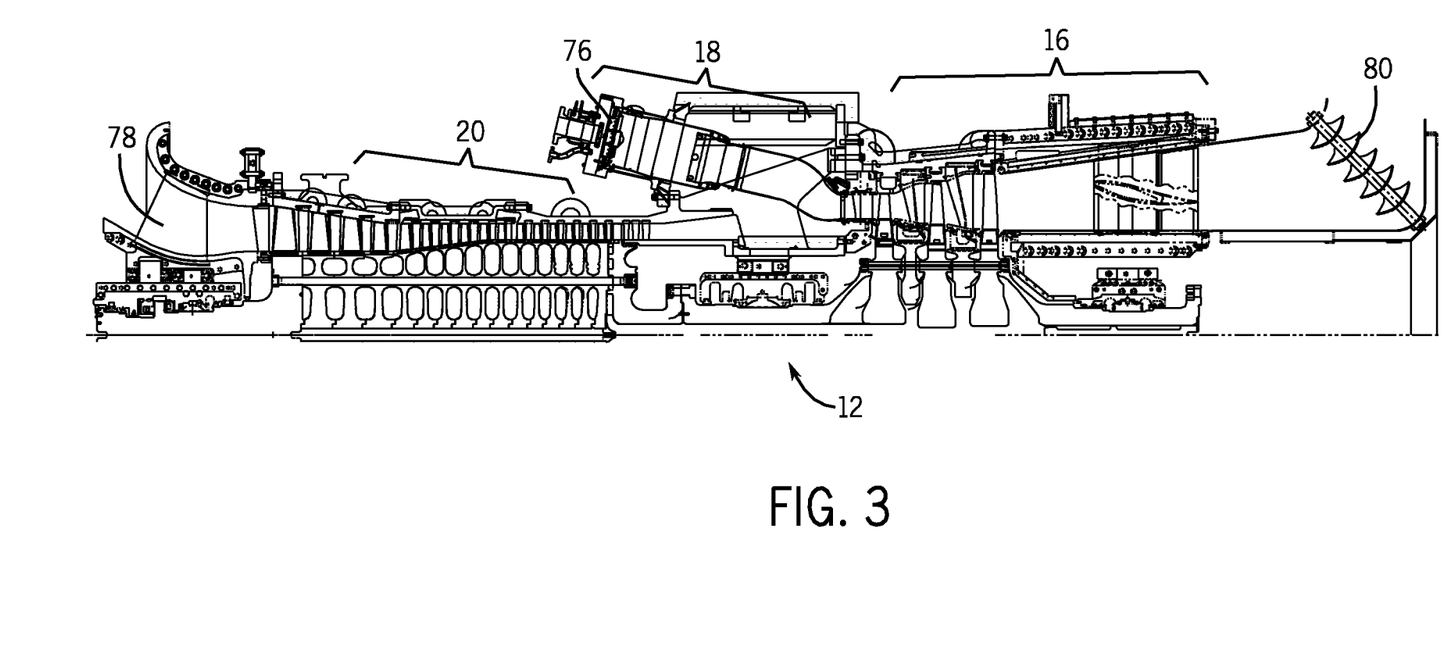
FIG. 3 is a cutaway side view of an embodiment of the turbine system, as shown in FIG. 2.

FIG. 3 is a cutaway side view of an embodiment of turbine system 12, shown in FIG. 2. Turbine system 12 includes one or more fuel nozzles 76 located inside one or more combustors 18, wherein each fuel nozzle 76 delivers the fuel mixture 74 (e.g., LBTU gas fuel 66 and vaporized HBTU liquid fuel 70) in accordance with unique aspects of the disclosed embodiments. In one embodiment, six or more fuel nozzles 76 may be attached to the base of each combustor 18 in an annular or other arrangement. Moreover, the system 12 may include a plurality of combustors 18 (e.g., 4, 6, 8, 12) in an annular arrangement. Air enters the system 12 through air intake 78 and may be pressurized in compressor 20. The compressed air may then be mixed with gas for combustion within combustor 18. For example, fuel nozzles 76 may inject a fuel-air mixture into combustors in a suitable ratio for optimal combustion, emissions, fuel consumption, and power output. The combustion generates hot pressurized exhaust gases, which then drive blades within the turbine 16 to rotate shaft 82 and, thus, compressor 20 and load 14. The rotation of the turbine blades may cause a rotation of shaft 82, thereby causing blades within compressor 20 to draw in and pressurize air. Again, as discussed above, a mixing chamber or mixer 72 may be coupled to combustor 18 in order to control the heating value of the fuel injected by fuel nozzles 76 into combustor 18. As such, the mixing chamber 72 enables better control of the combustion process, thereby providing more flexibility for usage of turbine system 12 in different conditions and also allowing several types of fuels to be utilized by the turbine. Specifically, lower cost LBTU fuels may be used in more turbine systems 12 and in a wider range of conditions, due to the flexibility enabled by the adjustable fuel quality level provided by mixing chamber 72, gas fuel mixture 66, mixed fuel 74, and related components. The ability of the turbine systems 12 to adjust fuel quality to load levels and the state of the turbine system 12 enables a reduction in overall fuel costs.

Figure 4:
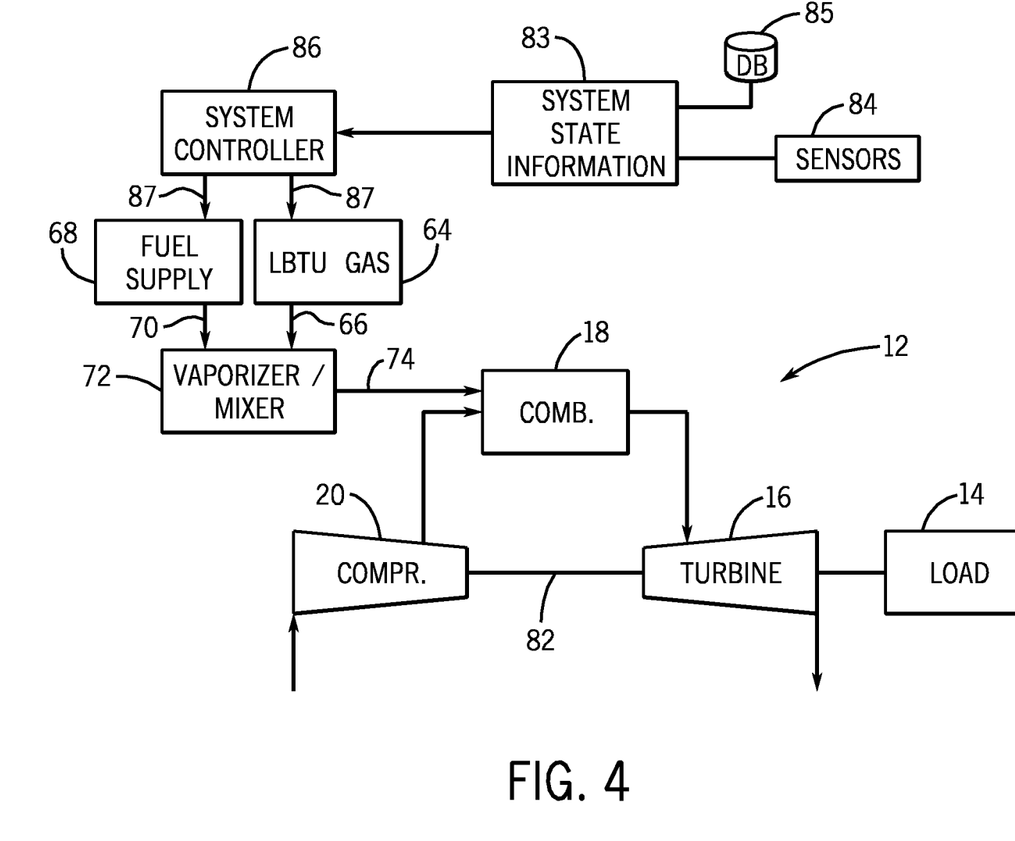
FIG. 4 is a block diagram of an embodiment of the turbine system, including a system controller and other components configured to enable a fuel mixing process.

FIG. 4 is a detailed block diagram of an embodiment of turbine system 12, including a system controller 86 and other components configured to enable a fuel mixing process in mixing chamber 72. Information about the state of the system, depicted by block 83, which includes measurements from sensors 84 and historical data stored in a database 85, may be sent to system controller 86 and used to control fuel sources 64 and 68. For instance, historical data provided by database 85 may indicate periods of increased loads for turbine system 12, thereby enabling system controller 86 to adjust the fuel mixture accordingly. As depicted, system controller 86 is coupled, via control lines 87, to liquid fuel supply 68 (e.g., HBTU liquid fuel) and gas fuel source 64 (e.g., LBTU gas fuel). In addition, system controller 86 may regulate and control the flow rates, temperatures, mixing ratios, and other conditions of liquid fuel supply 68 and gas fuel source 64 via control lines 87. Specifically, control lines 87 may include electrical and fluid communication lines in order to control valves, actuators, sensors, and other equipment to control a fuel mixing process within mixing chamber 72. System controller 86 may be coupled to heating coils or another suitable heating/cooling mechanism to control the temperatures of liquid fuel supply 68 and gas fuel source 64. Further, in an embodiment, the controller 86 may be configured to control a flow rate of the low BTU fuel 66 and a flow rate of the high BTU fuel 70. In addition, the controller 86 is configured to control the temperature of the low BTU fuel 66 and the temperature of the high BTU fuel 70.

In one embodiment, system controller 86 may be an industrial computer connected to turbine system 12 components, enabling system controller 86 to adjust a fuel mixing process according to system conditions. For instance, sensors 84 located throughout turbine system 12 may indicate an increased load, thereby causing system controller 86 to increase the fuel quality level produced by mixer 72. System controller 86 may utilize control valves to increase the flow rate of HBTU fuel 70 coming from liquid fuel supply 68 to increase the mixed fuel quality level, thereby producing more power for a heavy load system state. As previously discussed, system controller 86 may increase a fuel quality level according to trend data indicating a heavy load usage, based on repeated and periodic trended data stored in database 85 during periodic incidents of heavy loads for turbine system 12. For example, if a turbine system 12 experiences heavy loads at 2:00 p.m. each day in operation, system controller 86 may increase a fuel quality level in mixer 72 in anticipation of this trended data. Further, if trended data indicates a low load operational trend, system controller 86 may reduce or eliminate mixing of HBTU liquid fuel 70 with LBTU gas fuel 66 during periods of low loads. As illustrated, mixer 72 is coupled to combustor 18, thereby routing a mixed fuel stream 74 to combustor 18 for a combustion process that powers turbine system 12. As appreciated, the combustion process drives turbine 16 as exhaust gas flows, thereby driving load 14 and rotating shaft 82.

Figure 5:
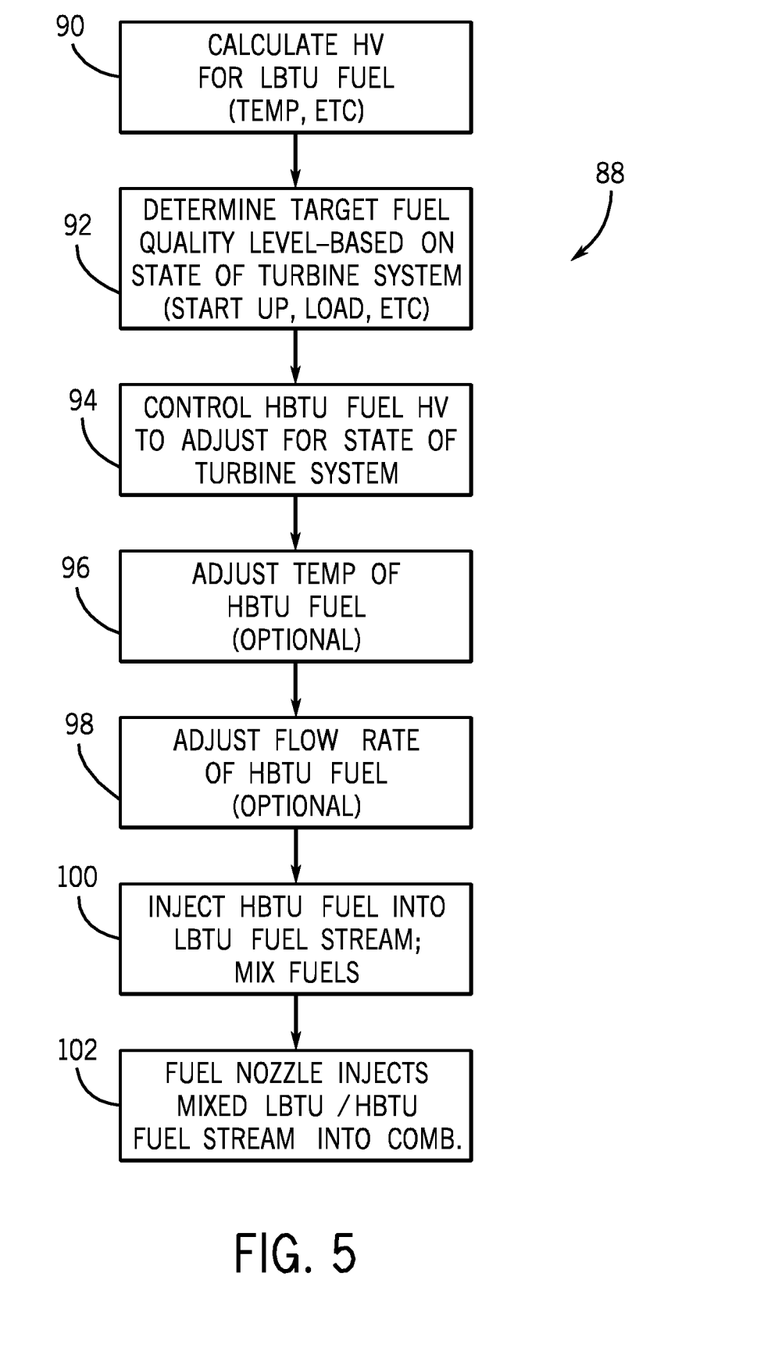
FIG. 5 is a flow chart of an exemplary method for monitoring and controlling a fuel mixing process of the turbine system.

FIG. 5 is a flow chart of an exemplary method (e.g., a computer-implemented method) for monitoring and controlling a fuel mixing process of a turbine combustor. The method 88 may be an integrated part of monitoring and control software and may be displayed on an operator interface of a system controller 86 computer. In step 90, a lower heating value (LHV) or heating value (HV) may be calculated for a LBTU fuel stream and supply. For example, a system controller 86 may calculate a heating value for a LBTU fuel by sensing the temperature of the fuel, a flow rate of the fuel, and/or other conditions. In step 92, a target fuel quality level is determined, based on the state of turbine system 12. As previously discussed, the turbine system 12 state may include a start-up state, a heavy load state, a steady state, or other system states that may determined by archived data or by real time system measurements. In step 94, the heating value for a liquid HBTU fuel may be controlled, via temperature, flow rate, or other mechanisms, to adjust for the determined state of the turbine system 12. For instance, a temperature of liquid HBTU fuel may be increased or decreased to adjust the heating value of the liquid fuel depending upon the system state, such as heavy load or steady state.

In step 96, system controller 86 may determine if the heating value of the liquid fuel supply needs to be altered and then may make the appropriate adjustments to the liquid HBTU fuel supply. For example, heating coils located in a liquid fuel storage tank to increase a temperature of liquid HBTU fuel supplied to turbine system 12. Alternatively, a series of liquid heating or cooling channels may be used to change a fuel supply temperature. In step 98, a flow rate of the liquid HBTU fuel may also be adjusted depending upon the state of the turbine system 12. In an embodiment, the liquid HBTU fuel may be reduced to a minimal flow rate or no flow rate if the system is in a low load or steady state situation. In step 100, as previously described, a liquid HBTU fuel may be injected into the LBTU fuel stream and mixed with the fuels in a mixing chamber. By mixing the HBTU liquid fuel with the LBTU fuel, the mixed fuel may obtain approximately the desired heating value most suitable for the system state, enabling greater control over the combustion process within turbine system 12. Further, the flexible control over the fuel stream and heating values enable use of various fuels in various turbine configurations. In step 102, a fuel nozzle within the combustor injects the mixed fuel stream into the combustor for a combustion process, as previously described.

Technical effects of the invention include increased control and flexibility within a turbine system, by enabling a variable quality of fuel to be used, depending upon turbine system state and conditions. In addition, the fuel mixing chamber and system provides the ability to use LBTU fuels across different turbine applications, thereby decreasing fuel costs and production costs. Further, in some embodiments, the turbine system may result in increased performance, efficiency, and reduced emissions.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method, comprising:
determining a first heating value of a low British thermal unit (BTU) fuel;
determining a first target BTU level based on a start-up condition of the turbine system;
determining a second target BTU level based on a steady state condition of a turbine system;
determining a second heating value of a high BTU fuel; and
controlling mixing of the high BTU fuel and the low BTU fuel to produce a first mixed fuel based on the first target BTU level during the start-up condition of the turbine system; and
controlling mixing of the high BTU fuel and the low BTU fuel to produce a second mixed fuel based on the second target BTU level during the steady state condition of the turbine system, wherein the first and second mixed fuels both comprise the low BTU fuel during the start-up and steady state conditions.

2. The method of claim 1, wherein the low BTU fuel is a low BTU gas fuel and the high BTU fuel is a high BTU liquid fuel.

3. The method of claim 1, comprising mixing the high BTU fuel and the low BTU fuel in a mixing chamber upstream from a combustor of the turbine system during the start-up condition and the steady state condition.

4. The method of claim 3, wherein the low BTU fuel is a low BTU gas fuel and the high BTU fuel is a high BTU liquid fuel, wherein mixing comprises atomizing or vaporizing high BTU liquid fuel in the mixing chamber.

5. The method of claim 1, comprising monitoring operating parameters of the turbine system, accessing historical data relating to operation of the turbine system, and evaluating the operating parameters and the historical data to determine target BTU levels and control mixing of the high BTU fuel and the low BTU fuel.

6. The method of claim 1, comprising receiving the low BTU fuel from a supply of at least one of a blast furnace gas, a coke oven gas, or a syngas, further comprising mixing the blast furnace gas, the coke oven gas, or the syngas with the high BTU fuel in a mixing chamber upstream of a turbine combustor of the turbine system to produce a fuel mixture, and further comprising combusting the fuel mixture in the turbine combustor.

7. The method of claim 1, wherein the low BTU fuel comprises a low BTU gas fuel including at least one of a blast furnace gas, a coke oven gas, or a syngas.

8. The method of claim 7, wherein the high BTU fuel comprises a high BTU liquid fuel, and further comprising controlling mixing of the low BTU gas fuel and the high BTU liquid fuel in a mixing chamber upstream from a turbine combustor of the turbine system.

9. A turbine system, comprising:
a mixing chamber, comprising:
a low British thermal unit (BTU) fuel inlet configured to receive a low BTU fuel;
a high BTU fuel inlet configured to receive a high BTU fuel, wherein the mixing chamber is configured to mix the low BTU fuel and the high BTU fuel to produce a mixed fuel, and a ratio between the low BTU fuel and the high BTU fuel controls a heating value of the mixed fuel; and
a fuel outlet configured to route the mixed fuel to a fuel nozzle; and
a non-transitory tangible memory device having instructions to control mixing of the high BTU fuel and the low BTU fuel in the mixing chamber to produce a first mixed fuel during a start-up condition of the turbine system and a second mixed fuel during a steady state condition of the turbine system, wherein the instructions provide the low BTU fuel as part of the first and second mixed fuels during both the start-up and steady state conditions.

10. The system of claim 9, comprising a controller having the instructions, wherein the instructions further comprise instructions to adjust the ratio between the low BTU fuel and the high BTU fuel to change the heating value based on operating parameters of the turbine system.

11. The system of claim 10, wherein the operating parameters include the start-up condition, the steady state condition, a load amount, or a combination thereof, of the turbine system.

12. The system of claim 10, wherein the controller has instructions to reduce an amount of the high BTU fuel in the mixed fuel during the steady state condition, a low load condition, or a combination thereof, wherein the controller has instructions to increase the amount of the high BTU fuel in the mixed fuel during the start-up condition, a non-steady state condition, a high load condition, or a combination thereof.

13. The system of claim 9, wherein the low BTU fuel is a low BTU gas fuel and the high BTU fuel is a high BTU liquid fuel, and the mixing chamber is configured to atomize the high BTU liquid fuel.

14. The system of claim 13, wherein the mixing chamber is configured to vaporize the high BTU liquid fuel into the low BTU gas fuel.

15. The system of claim 9, comprising a low BTU gas fuel supply of at least one of a blast furnace gas, a coke oven gas, or a syngas configured to couple to the mixing chamber, a high BTU liquid fuel supply configured to couple to the mixing chamber, and a gas turbine engine having the fuel nozzle configured to couple to the mixing chamber.

16. The system of claim 9, comprising at least one supply of a blast furnace gas, a coke oven gas, or a syngas configured to couple to the mixing chamber.

17. The system of claim 16, wherein the at least one supply comprises a blast furnace, a coke oven, or a gasifier.

18. A turbine system, comprising:
a controller comprising a non-transitory tangible memory device having instructions to control mixing of a low British thermal unit (BTU) fuel with a high BTU fuel to produce a mixed fuel, wherein the controller has instructions to determine a first heating value for the mixed fuel based on a start-up condition of the turbine system and a second heating value for the mixed fuel based on a steady-state condition of the turbine system, the controller has instructions to control a ratio of the low BTU fuel to the high BTU fuel to achieve the first heating value for the mixed fuel during the start-up condition and to achieve the second heating value for the mixed fuel during the steady state condition, and the instructions provide the low BTU fuel as part of the mixed fuel during both the start-up and steady state conditions.

19. The system of claim 18, wherein the controller has instructions to monitor operating parameters of the turbine system to identify the start-up condition, a heavy load condition, a transient condition, the steady state condition, a low load condition, or a combination thereof.

20. The system of claim 19, wherein the controller has instructions to increase the a heating value of the mixed fuel for the transient condition, the start-up condition or the heavy load condition, and the controller has instructions to decrease the heating value of the mixed fuel for the steady state condition or the low load condition.

21. The system of claim 18, wherein the controller has instructions to control a first flow rate of the low BTU fuel and a second flow rate of the high BTU fuel.

22. The system of claim 18, wherein the controller has instructions to control a first temperature of the low BTU fuel and a second temperature of the high BTU fuel.

23. The system of claim 18, wherein the low BTU fuel is a low BTU gas fuel and the high BTU fuel is a high BTU liquid fuel, and the high BTU liquid fuel is atomized with the low BTU gas fuel.

24. The system of claim 18, wherein the low BTU fuel is a low BTU gas fuel and the high BTU fuel is a high BTU liquid fuel, and the high BTU liquid fuel is vaporized into the low BTU gas fuel.

25. The system of claim 18, comprising a gas turbine engine having the controller.

26. The system of claim 18, comprising a turbine fuel supply system having the controller, wherein the turbine fuel supply system comprises at least one supply of a coke oven gas, a blast furnace gas, or a syngas as the low BTU fuel.

27. The system of claim 18, wherein the controller has instructions to control mixing of a high BTU liquid fuel with a low BTU gas fuel including at least one of a coke oven gas, a blast furnace gas, or a syngas.

* * * * *